(12) United States Patent
Hagen

(10) Patent No.: US 11,702,290 B1
(45) Date of Patent: Jul. 18, 2023

(54) APPARATUS FOR HANDLING HEAVY OBJECTS

(71) Applicant: Ty Blair Hagen, New London, MN (US)

(72) Inventor: Ty Blair Hagen, New London, MN (US)

( * ) Notice: Subject to any disclaimer, the term of this patent is extended or adjusted under 35 U.S.C. 154(b) by 228 days.

(21) Appl. No.: 16/949,969

(22) Filed: Nov. 23, 2020

Related U.S. Application Data

(60) Provisional application No. 62/942,479, filed on Dec. 2, 2019.

(51) Int. Cl.
   *B65G 7/12* (2006.01)

(52) U.S. Cl.
   CPC .................................. *B65G 7/12* (2013.01)

(58) Field of Classification Search
   CPC ............. B65G 7/12; B66C 1/10; B66C 1/66
   USPC .......................... 294/15, 16, 119.2
   See application file for complete search history.

(56) References Cited

U.S. PATENT DOCUMENTS

| | | | | |
|---|---|---|---|---|
| 2,385,913 A | * | 10/1945 | Fink | B65G 7/12 99/426 |
| 2,832,630 A | * | 4/1958 | Sterling | B62B 3/104 414/403 |
| 3,052,441 A | * | 9/1962 | Fleischman | B62B 3/104 294/68.27 |
| 5,511,285 A | * | 4/1996 | Bush | B65G 7/12 294/170 |
| 5,549,339 A | * | 8/1996 | Frean | B65G 7/12 294/170 |
| 6,375,237 B1 | * | 4/2002 | Koenig | B25B 7/02 294/16 |
| 7,908,746 B2 | * | 3/2011 | Cox | H02G 3/081 29/842 |
| 8,313,130 B2 | * | 11/2012 | Hazel | E03D 11/135 294/144 |
| 8,959,857 B1 | | 2/2015 | Lin | |
| 9,347,196 B2 | | 5/2016 | Wagler | |
| 9,463,569 B1 | * | 10/2016 | Douglas | B25G 1/102 |

\* cited by examiner

*Primary Examiner* — Paul T Chin

(74) *Attorney, Agent, or Firm* — FisherBroyles, LLP; Craig W. Mueller

(57) ABSTRACT

An apparatus configured to interconnect to a heavy and/or long object that facilitates manipulation and movement thereof is provided. More specifically, a lifting apparatus for interconnecting to an elongate beam used in post-frame construction is provided. The lifting apparatus comprises a frame with a selectively closable door that encircles the beam and secures the same. The lifting apparatus includes at least one handle that can be grasped by an individual.

18 Claims, 12 Drawing Sheets

APPARATUS FOR HANDLING HEAVY OBJECTS

This application claims the benefit of U.S. Provisional Patent Application Ser. No. 62/942,479, filed Dec. 2, 2020, the entirety of which is incorporated by reference herein.

FIELD OF THE INVENTION

Background of the Invention

Post-frame construction refers to wood-framed building techniques that employ a plurality of wooden beams positioned on an extended footing, or more commonly, on individual pads that sometimes provide selective height adjustment. The wooden beams are interconnected to the pad or footing with a bracket. The advantage of post-frame construction over other construction types is that continuous concrete footings are not necessarily required, which reduces construction time and costs. Examples of post-frame construction are disclosed in U.S. Pat. Nos. 8,959,857 and 9,347,196, which are incorporated by reference in their entireties herein.

One drawback of post-frame construction is that the beams are often very heavy and cumbersome to manipulate. For example, some beams are comprised of triple-laminated, hydraulically compressed wood, consisting of a plurality of glued 2×6-inch or 4×6-inch planks. Beams often span about 60 feet in length and weigh about 100 to 200 pounds. It is often virtually impossible for an individual or small team of individuals to lift and safely maneuver a beam. Accordingly, cranes or portable gantries are needed to move and place beams at a desired location and orientation.

Thus, it is a long-felt need to provide an easy and safe way to engage and manipulate heavy wooden beams. The following disclosure describes a lifting apparatus that selectively engages a beam so that one or more individuals can manipulate it.

SUMMARY OF THE INVENTION

It is one aspect of some embodiments of the present invention to provide a lifting apparatus configured to selectively interconnect with a wooden beam, which could be comprised of a plurality of planks glued or fastened together. Although a wooden beam is primarily described herein, those of ordinary skill in the art will appreciate upon review of the foregoing that the contemplated lifting apparatus may be used with other types of beams, such as metal beams, without departing from the scope of the invention. The lifting apparatus includes at least one handle that facilitates lifting of the attached object. In addition, the lifting apparatus employs means that help ensure a secure connection between the lifting apparatus and the beam. Further, the lifting apparatus is designed to be quickly and easily interconnected to the beam.

The lifting apparatus of one embodiment of the present invention is generally comprised of a frame with three sidewalls adapted to engage corresponding sides of the beam. At least one of the frame sidewalls includes a handle. A door, which may be operatively interconnected to the frame, is closed and secured to one of the frame sidewalls, thereby encircling the beam. A lock may be provided to securely interconnect the door to the frame. Further, the door may also include a handle.

It is another aspect of some embodiments of the present invention to provide a lifting apparatus that firmly engages the beam to which it is attached. It is a related aspect of some embodiments of the present invention to provide a lifting apparatus that can accommodate beams of different sizes. More specifically, some embodiments of the present invention employ at least one riser interconnected to an inner surface of the frame sidewall or the door that effectively decreases the internal volume of the lifting apparatus to accommodate beams of a smaller outer dimension. The risers of one embodiment of the present invention are bolted to the inner surface of the frame sidewall(s) or door and may be quickly removed if needed to accommodate larger beams. The risers may have a knurled, spiked, or studded facing surface that enhances beam engagement. Alternatively, the facing surface may include a compliant material, such as rubber, to enhance grip. Some embodiments also employ a plurality of bolts that may include pointed tips that extend through the door and/or frame sidewalls that selectively engage the beam.

The lifting apparatus of one embodiment of the present invention is made of welded steel and weighs about 20 pounds. As one of ordinary skill in the art will appreciate, more than one lifting apparatus may be required to manipulate longer or heavier beams. The lifting apparatus may be powder coated or painted for protection from the elements and to reduce oxidation.

The Summary of the Invention is neither intended nor should it be construed as being representative of the full extent and scope of the present invention. That is, these and other aspects and advantages will be apparent from the disclosure of the invention(s) described herein. Further, the above-described embodiments, aspects, objectives, and configurations are neither complete nor exhaustive. As will be appreciated, other embodiments of the invention are possible using, alone or in combination, one or more of the features set forth above or described below. Moreover, references made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and the Detailed Description and no limitation as to the scope of the present invention is intended by either the inclusion or non-inclusion of elements, components, etc. in this Summary of the Invention. Additional aspects of the present invention will become more readily apparent from the Detailed Description, particularly when taken together with the drawings.

The above-described benefits, embodiments, and/or characterizations are not necessarily complete or exhaustive, and in particular, as to the patentable subject matter disclosed herein. Other benefits, embodiments, and/or characterizations of the present invention are possible utilizing, alone or in combination, as set forth above and/or described in the accompanying figures and/or in the description herein below.

The phrases "at least one," "one or more," and "and/or," as used herein, are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

Unless otherwise indicated, all numbers expressing quantities, dimensions, conditions, and so forth used in the specification and drawing figures are to be understood as being approximations which may be modified in all instances as required for a particular application of the novel apparatus and method described herein.

The term "a" or "an" entity, as used herein, refers to one or more of that entity. As such, the terms "a" (or "an"), "one or more" and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials, or acts and the equivalents thereof shall include all those described in the Summary, Brief Description of the Drawings, Detailed Description and in the appended drawing figures.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these inventions.

Figure 1:
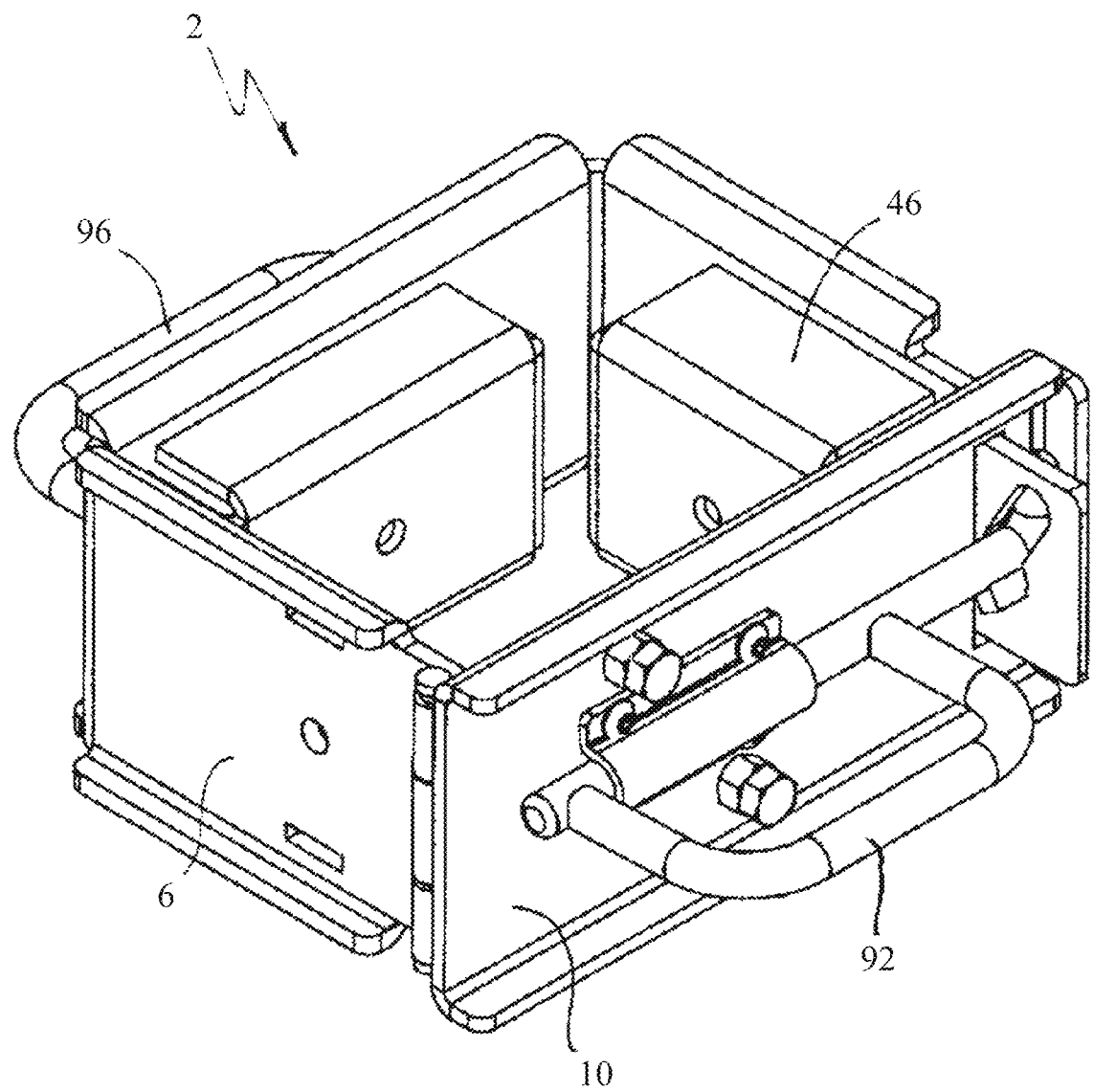
FIG. 1 is a perspective view of a lifting apparatus of one embodiment of the present invention.
Figure 2:
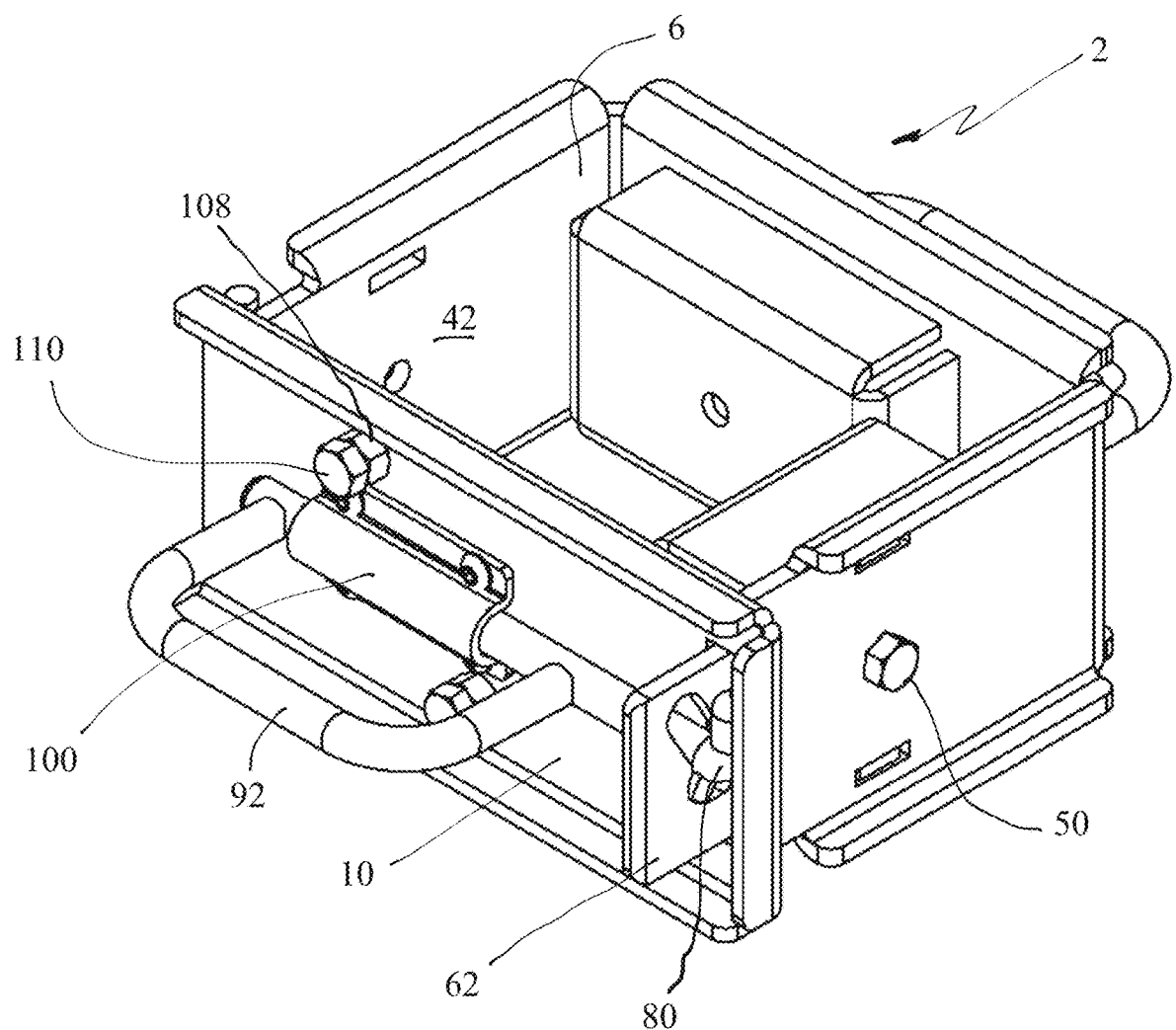
FIG. 2 is another perspective view of the lifting apparatus shown in FIG. 1.
Figure 3:
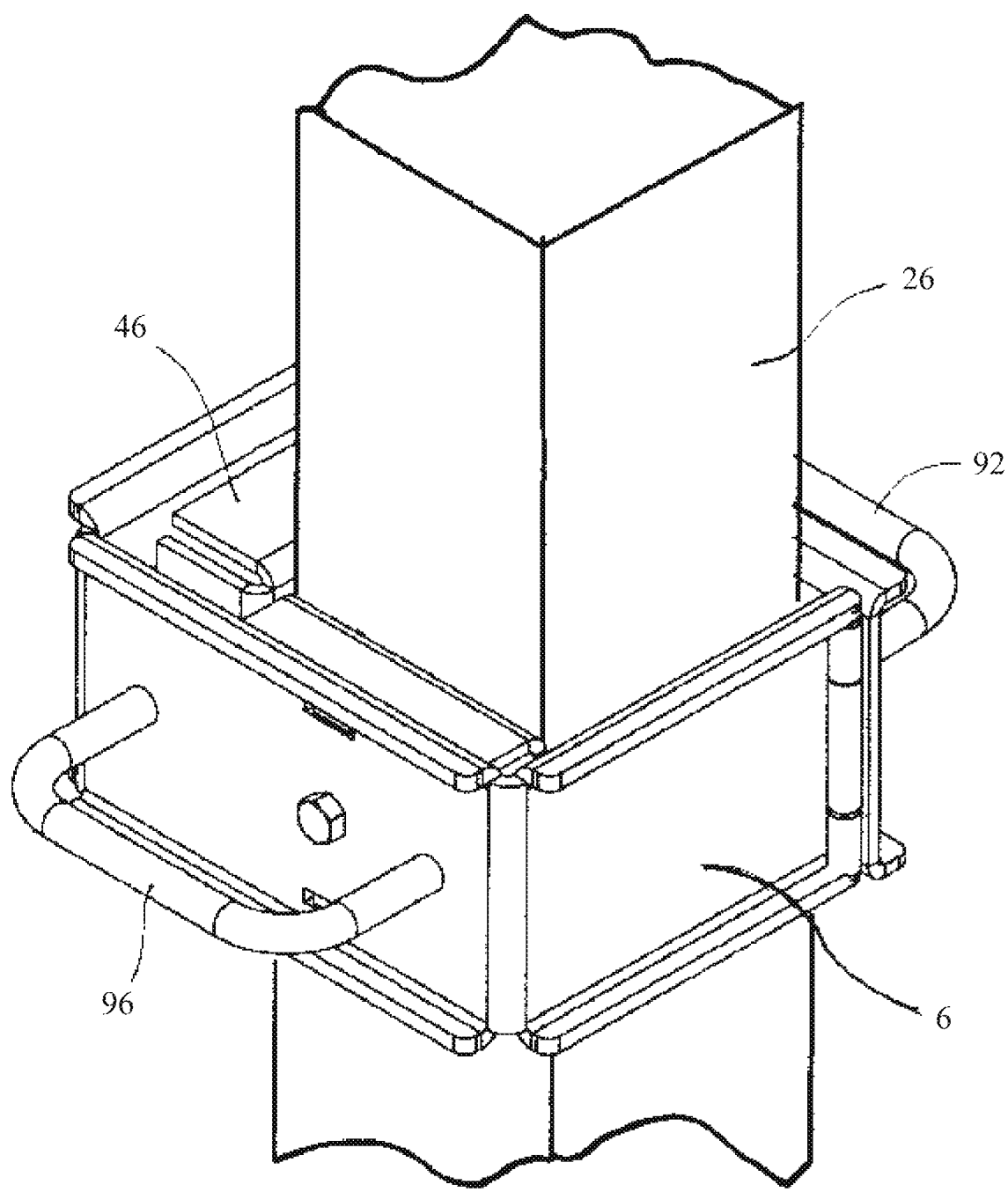
FIG. 3 is a rear perspective view of the lifting apparatus shown in FIG. 1 interconnected to a beam.
Figure 4:
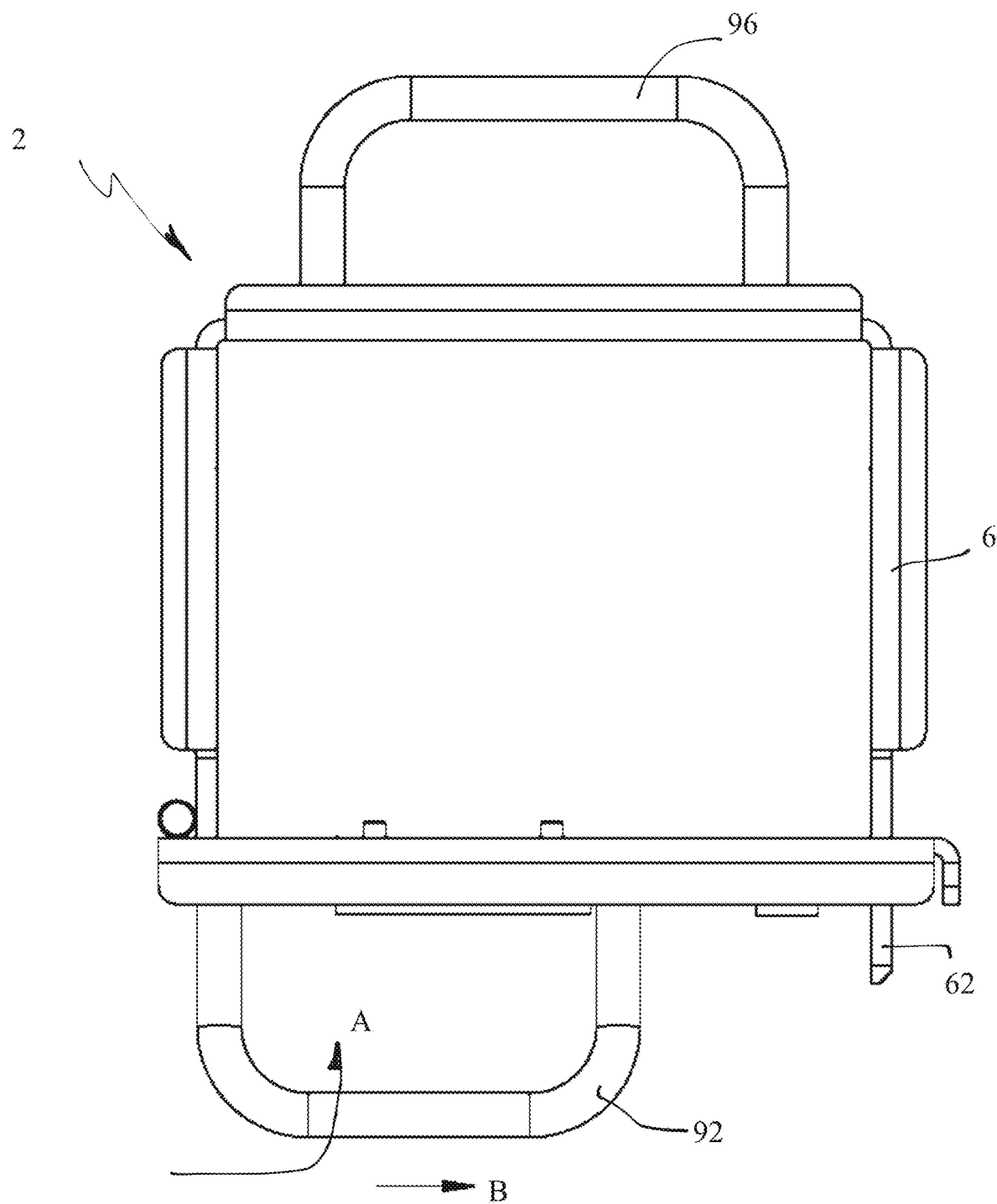
FIG. 4 is a top elevation view of the lifting apparatus shown in FIG. 1.
Figure 5:
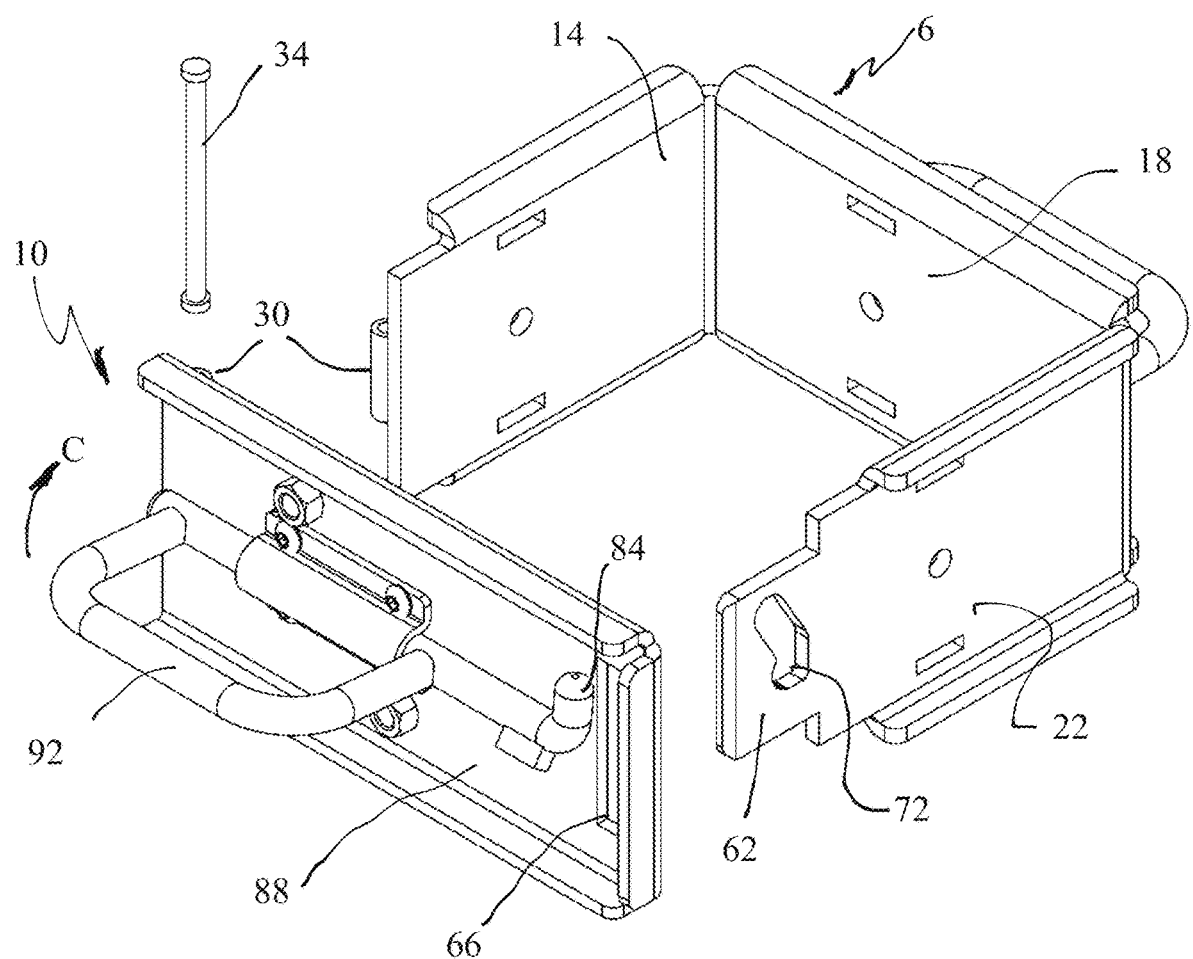
FIG. 5 is an exploded view of the lifting apparatus shown in the orientation of FIG. 2.

The following component list and associated numbering found in the drawings is provided to assist in the understanding of one embodiment of the present invention:

COMPONENT

2 Lifting apparatus
6 Frame
10 Door
14 Left sidewall
18 Middle sidewall
22 Right sidewall
26 Beam
30 Hinge
34 Pin
42 Inner surface
46 Riser
50 Bolts
54 Nut
62 Tongue
66 Slot
72 Opening
76 Lock slide
80 Hook
84 Hook end
88 Latch plate
92 Lock handle
96 Fixed handle
98 Curled edge
100 Primary bracket
110 Bolt
112 Longitudinal axis
116 Apertures
120 Groove
124 Face
128 Wall
132 Protrusion
202 Lifting apparatus
206 Frame
210 Door
214 Left sidewall
218 Middle sidewall
222 Right sidewall
226 Beam
230 Hinge
234 Pin
236 Sleeve
240 End sleeve
244 Pin
250 Spike
254 Nut
258 Bar
262 Tube
296 Handle It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

FIGS. 1-10 show a lifting apparatus 2 of one embodiment of the present invention comprised of a frame 6 that accommodates a rotatably interconnected door 10. The frame 6 has a left sidewall 14, a middle sidewall 18, and a right sidewall 22 designed to selectively engage with corresponding surfaces of a beam 26. In one embodiment, the left sidewall 14, middle sidewall 18, and right sidewall 22 are of a unitary structure. In alternate embodiments, the sidewalls are selectively interconnected or foldable with respect to each other (i.e., operably interconnected). In the example shown, the door 10 is operably interconnected to the left sidewall 14 by way of a hinge 30/pin interface 34. A free end of the door 10 is selectively locked to the right sidewall 22. Although the door and sidewalls are shown having planar inner surfaces 42, one of ordinary skill in the art will appreciate that the sidewalls, or the inner surfaces thereof, may have arcuate profiles to accommodate round beams or posts.

The sidewalls define an internal volume for accepting and securing the beam 26. In some embodiments, the internal volume is decreased by risers 46 interconnected to the sidewalls. The risers 46 are selectively interconnected to their respective sidewalls by bolts 50 that engage nuts 54 welded into the inner surfaces 42 of the sidewalls, which will be described in further detail below. The risers 46 may also be secured to the sidewalls by protrusions that fit within complementary grooves or slots provided by the sidewalls. Again, the riser's primary purpose is to decrease the internal volume of the lifting apparatus 2 so that beams with smaller external profiles can be accommodated. As mentioned above, the risers 46 may have a textured or rubberized surface to facilitate engagement with the beam. One of ordinary skill in the art will also appreciate that the frame and door's inner surfaces may also have a knurled or rubberized surface to enhance engagement with the outer surface of the beam.

In FIG. 1 the door 10 shown is selectively locked to the right sidewall 22. The right sidewall includes a tongue 62 extending through a slot 66 in the door 10 when it is in a closed position. The tongue 62 includes an opening 72 for selective receipt of a lock provided by the door, which will be described in further detail below. In operation, the beam is lifted or otherwise maneuvered to expose the four sides thereof, or in the case of around beam, it's outer surface. This operation can be performed with a gantry or by hand, as the amount of elevation required for the frame sidewalls to accommodate the beam is minimal. The beam is then lowered into and supported by the frame 6. Thereafter, the door 10 is closed (in the direction of Arrow A in FIG. 4) and locked to the right sidewall 22 of the frame. This operation comprises feeding the tongue 62 through the slot 66 on the door, thereby placing a lock opening 72 outside the door. Next, a lock slide 76 that terminates in a hook 80 is moved towards the lock opening 72 (in the direction of Arrow B in FIG. 4), which moves the hook 80 through the lock opening 72. The lock slide is rotated in the direction of Arrow C (FIG. 5), which prevents movement of the lock slide 76 in the direction opposite to that of Arrow B, thereby locking the door 10 to the frame 6. The opening 72 may be positioned at an angle relative to a longitudinal axis of the apparatus. Rotation of the lock slide in the direction of Arrow C may also abut at least an end portion 84 of the hook adjacent to or against a latch plate 88 of the door to support a lock handle 92 in his preferred position of use when the lifting apparatus is in use, i.e., substantially aligned with a fixed handle 96 interconnected to the middle sidewall 18. Those of ordinary skill in the art will appreciate that some embodiments may provide a means to lock the handle 92 in the preferred orientation during use.

Figure 6:
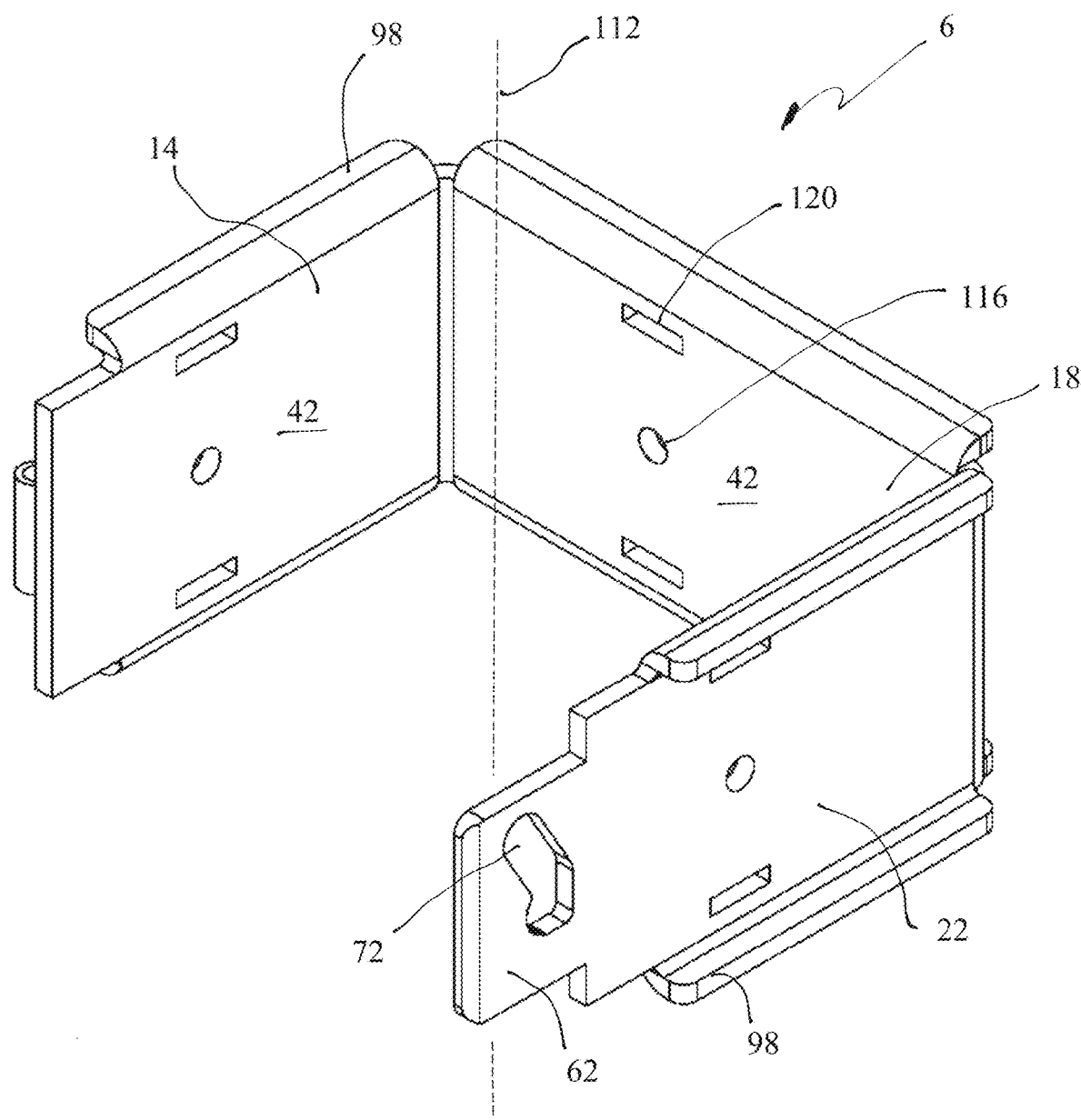
FIG. 6 is a perspective view of a frame of the lifting apparatus shown in the orientation of FIG. 2.
Figure 7:
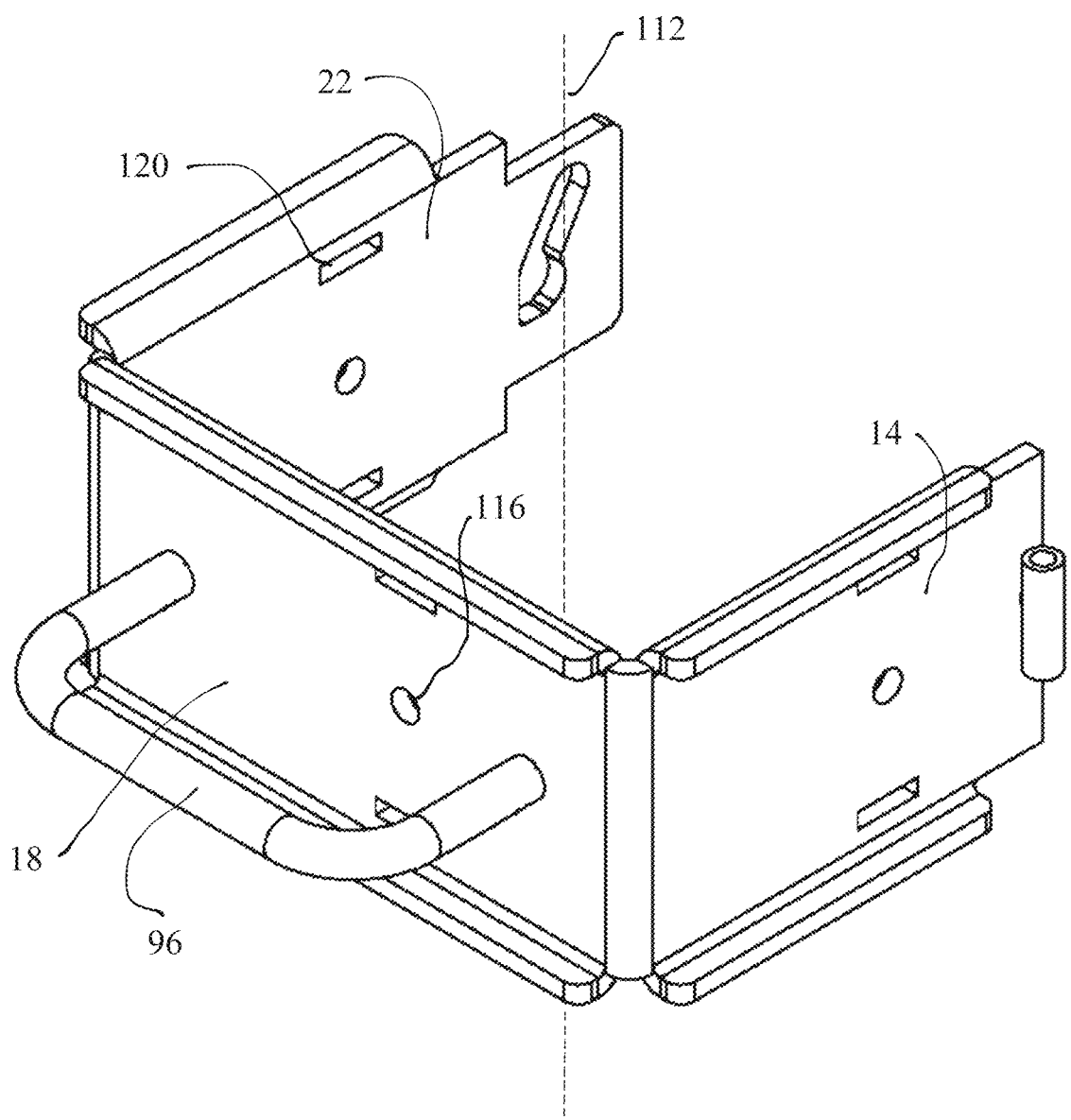
FIG. 7 is another perspective view of the frame shown in the orientation of FIG. 2.

FIGS. 6 and 7 show the frame 6 of one embodiment of the present invention comprised of the left sidewall 14, middle sidewall 18, and right sidewall 22. Again, the right sidewall 22 includes an outwardly extending tongue 62 with a lock opening 72. The sidewalls may include upper and lower curled edges 98 to increase frame stiffness. The left sidewall 14 shown includes the hinge 30 that receives the pin 34 that operatively interconnects the door 10 to the frame 6. Although one fixed handle 96 is shown interconnected to the middle sidewall 18, those of ordinary skill in the art will appreciate that a plurality of handles may be provided. In addition, the handle may be oriented generally parallel to a longitudinal axis 112 of the apparatus. The sidewalls may also include apertures 116 configured to receive bolts, which may include sharpened tips, for engagement with the beam. Furthermore, grooves 120 or slots may be provided in the sidewalls for receiving complementary riser protrusions.

Figure 8:
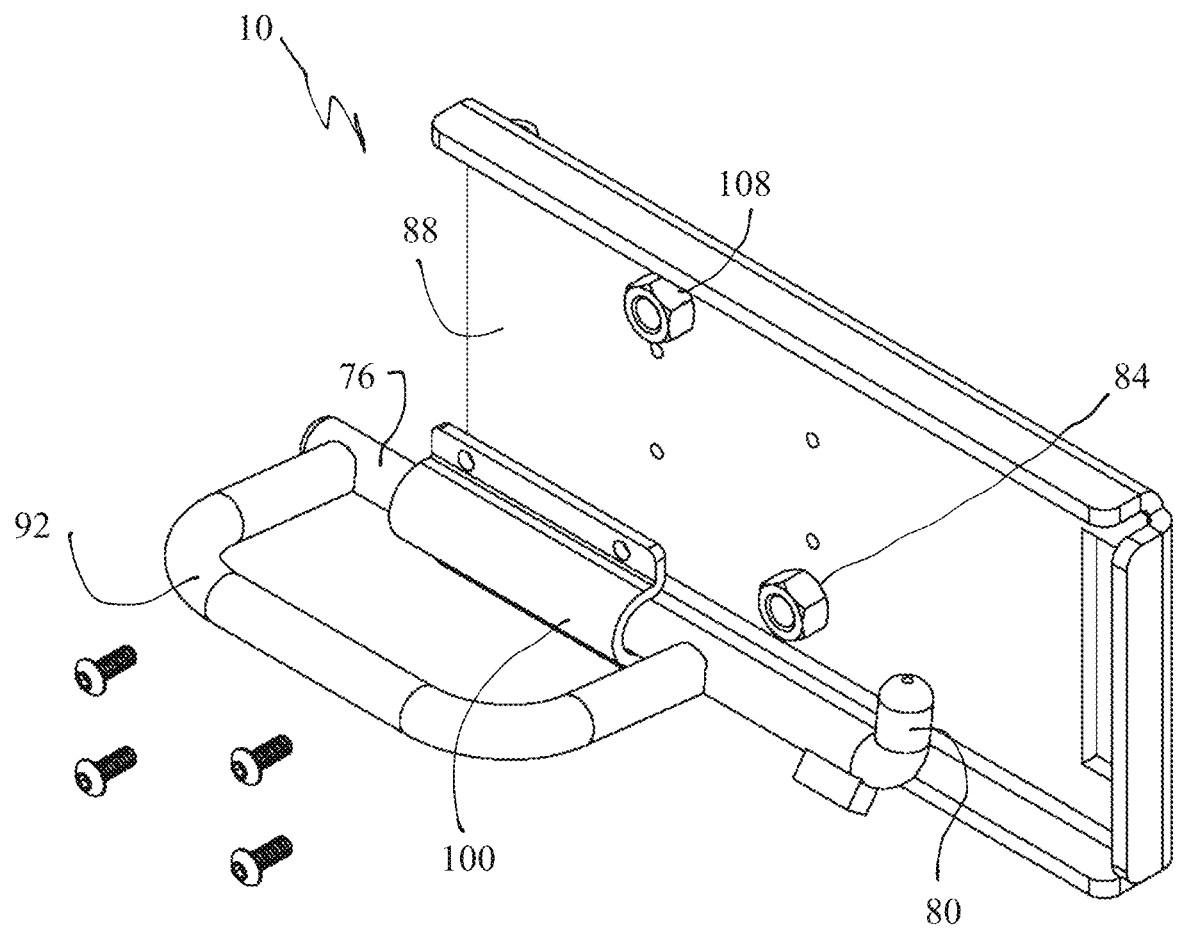
FIG. 8 is an exploded view of a door of the embodiment shown in the orientation of FIG. 2.

FIG. 8 shows the door 10 of one embodiment of the present invention comprised of a latch plate 88 with brackets supporting the lock slide 76. Here, a primary bracket 100 supports the majority of the lock slide 76 between end portions of the lock handle 92. A secondary bracket may also be provided between a lock handle end and the hook 80. Here, the lock handle 92 is interconnected to the lock slide 76, which helps one move the lock from a first position of use to a second, locked position of use. One of ordinary skill in the art will appreciate that this handle may be omitted or replaced with a different member facilitates lock slide movement. In some embodiments, a handle opposite to the fixed handle is interconnected directly to the latch plate 88. The latch plate 88 may also include a plurality of nuts 108 that align with apertures in the latch plate. In operation, the nuts 108 operatively receive bolts or threaded spikes that pierce or otherwise contact the beam when tightened.

Figure 9:
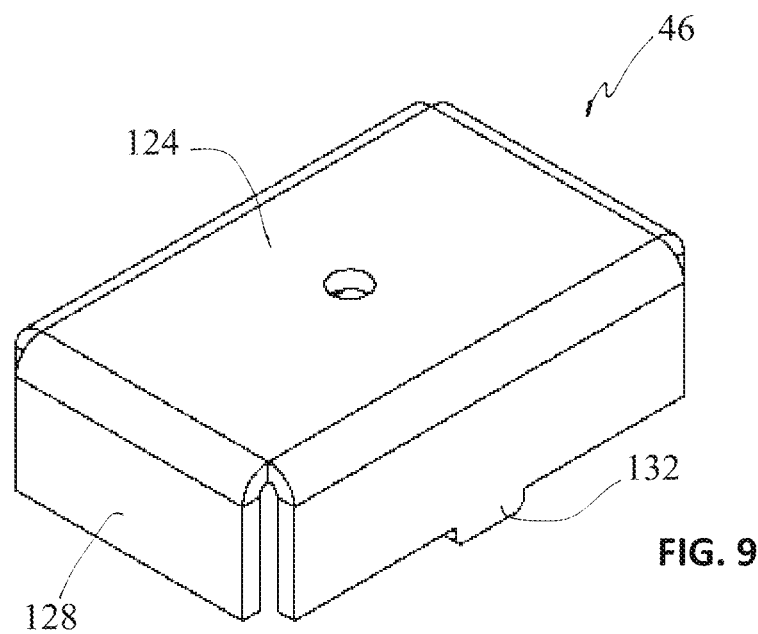
FIG. 9 is an outer perspective view of a riser employed by some embodiments of the present invention.
Figure 10:
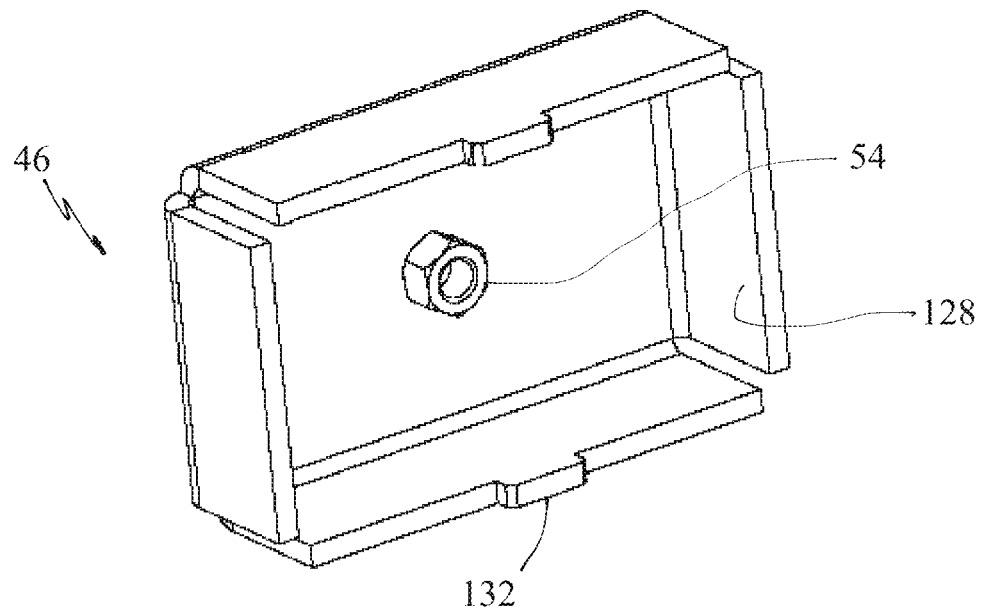
FIG. 10 is an inner perspective view of the riser shown in FIG. 9.

FIGS. 9 and 10 show risers 46 of some embodiments the present invention comprised of a face 124 with walls 128 extending therefrom. Each wall 128, or a subset thereof, may include protrusions 132 that selectively fit into the corresponding slots or grooves 120 (FIG. 6) provided in the frame to fix the location of the riser 46 with respect to the frame sidewall. The risers 46 are secured to the frame sidewalls with bolts that engage the nuts 54 welded to the interior of the face. As mentioned above, the face 124 may employ a knurled or textured surface. In some embodiments, the face accommodates a rubberized foot.

Figure 11:
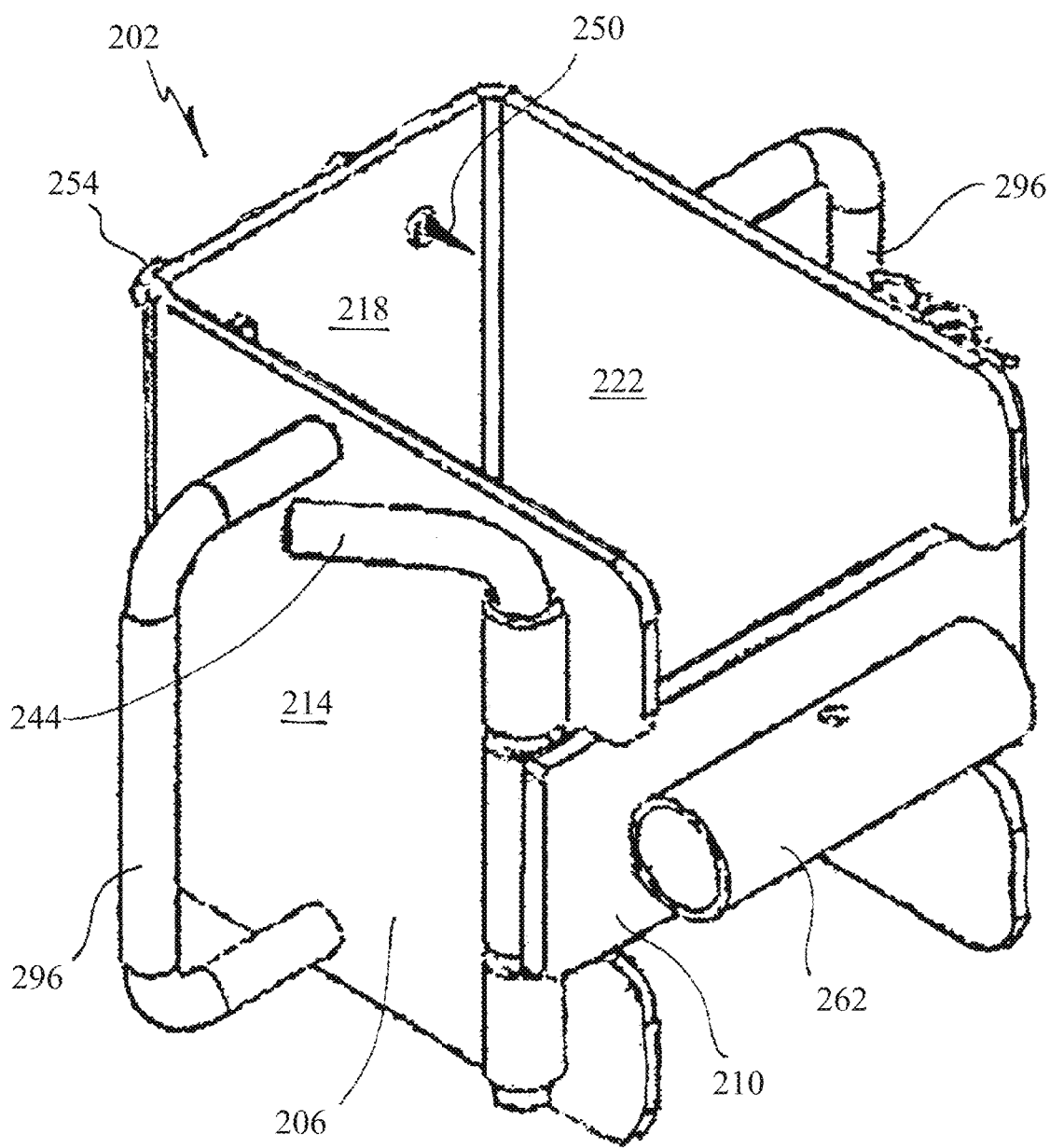
FIG. 11 is a perspective view of a lifting apparatus of another embodiment of the present invention.
Figure 12:
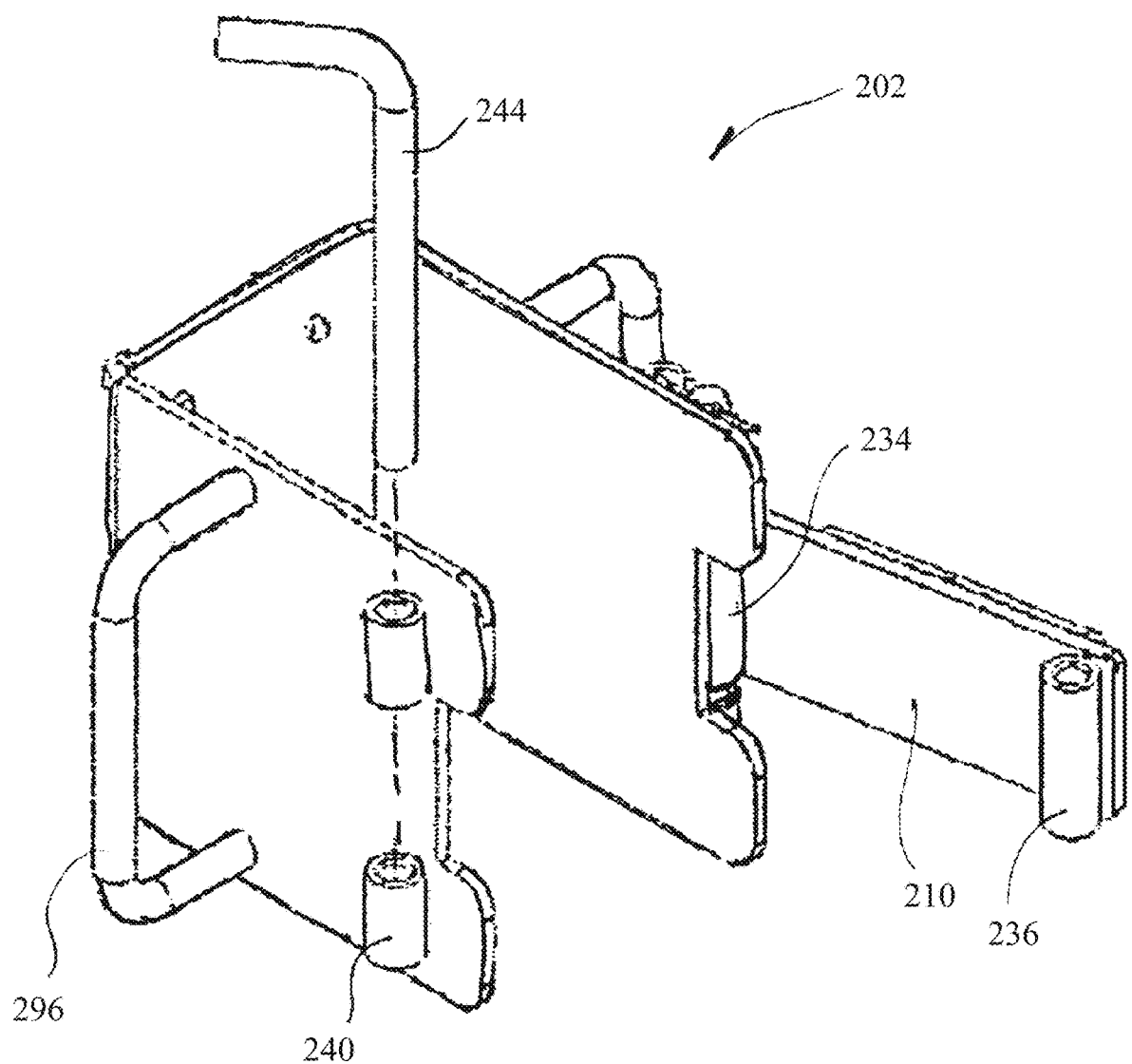
FIG. 12 is a perspective view of the lifting apparatus of FIG. 11 in an open configuration.
Figure 13:
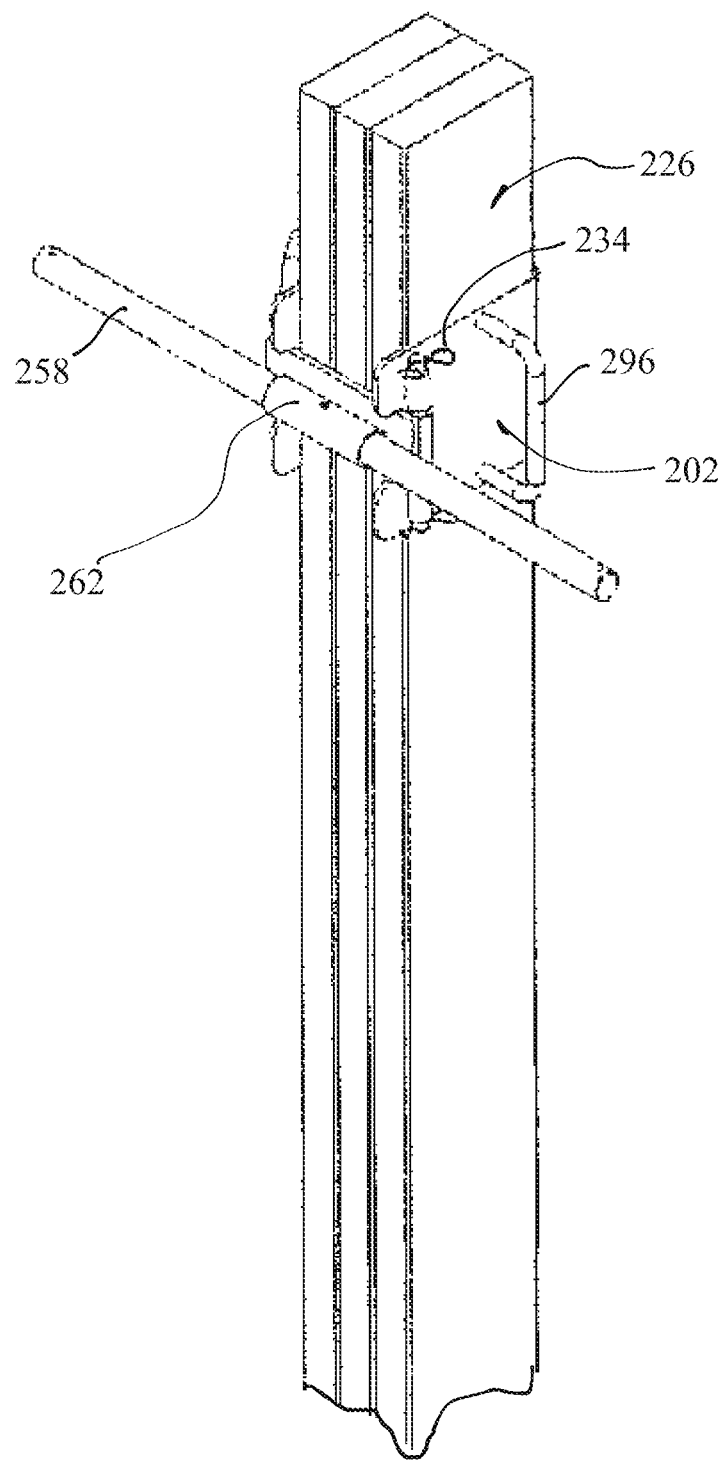
FIG. 13 is a perspective view of the lifting apparatus of FIG. 11 interconnected to a beam.

FIGS. 11-13 show a lifting apparatus 202 of another embodiment of the present invention that employs a frame 206 with a hinged door 210. The frame consists of a left sidewall 214, a middle sidewall 218, and a right sidewall 222 that receive and secure a beam 226. Here, the door 210 is interconnected to the right sidewall by a hinge 230 and a pin 234. An opposite side of the door includes a sleeve 236 that cooperates with end sleeves 240 provided on the left sidewall 214, wherein a second pin 244 is used to maintain the door 210 in a closed and locked position. The middle sidewall 218 of this embodiment of the present invention employs a plurality of spikes 250 that are selectively engaged within nuts 254 welded into the middle sidewall 218. One of ordinary skill in the art will appreciate that spikes may also be included in the left and right sidewalls. Tightening the spikes will engage a portion thereof into the interconnected beam 226. The left and right sidewalls of the frame include handles 296.

FIG. 13 shows the lifting apparatus 202 of this embodiment interconnected to the beam 226, wherein a removable bar 258 is inserted into a complementary tube 262 provided on the door 210. One of ordinary skill in the art should appreciate that the tube 262 may alternatively be interconnected to the left, right, or middle sidewall.

Exemplary characteristics of embodiments of the present invention have been described. However, to avoid unnecessarily obscuring embodiments of the present invention, the preceding description may omit several known apparatus, methods, systems, structures, and/or devices one of ordinary skill in the art would understand are commonly included with the embodiments of the present invention. Such omissions are not to be construed as a limitation of the scope of the claimed invention. Specific details are set forth to provide an understanding of some embodiments of the present invention. It should, however, be appreciated that embodiments of the present invention may be practiced in a variety of ways beyond the specific detail set forth herein.

Modifications and alterations of the various embodiments of the present invention described herein will occur to those skilled in the art. It is to be expressly understood that such modifications and alterations are within the scope and spirit of the present invention, as set forth in the following claims. Further, it is to be understood that the invention(s) described herein is not limited in its application to the details of construction and the arrangement of components set forth in the preceding description or illustrated in the drawings. That is, the embodiments of the invention described herein are capable of being practiced or of being carried out in various ways. The scope of the various embodiments described herein is indicated by the following claims rather than by the foregoing description. And all changes which come within the meaning and range of equivalency of the claims are to be embraced within their scope. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The foregoing disclosure is not intended to limit the invention to the form or forms disclosed herein. In the foregoing Detailed Description, for example, various features of the invention are grouped together in one or more embodiments for the purpose of streamlining the disclosure. This method of disclosure is not to be interpreted as reflecting an intention that the claimed inventions require more features than expressly recited. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention. Further, the embodiments of the present invention described herein include components, methods, processes, systems, and/or apparatus substantially as depicted and described herein, including various sub-combinations and subsets thereof. Accordingly, one of skill in the art will appreciate that would be possible to provide for some features of the embodiments of the present invention without providing others. Stated differently, any one or more of the aspects, features, elements, means, or embodiments as disclosed herein may be combined with any one or more other aspects, features, elements, means, or embodiments as disclosed herein.

What is claimed is:

1. An apparatus for interconnecting to a beam, comprising:
    a frame having a left sidewall, a right sidewall, and a middle sidewall connecting the left sidewall to the right sidewall, the middle sidewall having a fixed handle and the right sidewall having a tongue extending therefrom;
    a door rotatably interconnected to the left sidewall, the door having a slot configured for selective receipt of the tongue; and
    a lock interconnected to the door and comprised of a slide with a hooked end and a movable handle, wherein the slide has an open position of use where the slide and handle are rotated to align the hooked end with an opening in the tongue such that the hooked end is configured to be inserted through the opening, and a closed position of use where the hooked end is located outside the opening and the slide is rotated to position the movable handle in substantial alignment with the fixed handle, which prevents movement of the hooked end from the opening.

2. The apparatus of claim 1, wherein the door is hingedly interconnected to the left sidewall.

3. The apparatus of claim 1, wherein an internal volume defined by the inner surfaces of the left sidewall, the right sidewall, middle sidewall, and the door is adapted to receive and secure an elongate member having a cross sectional dimension of about 7.25 inches by 5.623 inches.

4. The apparatus of claim 1, wherein the left sidewall, the right sidewall, and the middle sidewall comprise a unitary structure.

5. The apparatus of claim 1, the door further comprising at least one opening configured to receive a screw or a spike.

6. The apparatus of claim 1, wherein the fixed handle is generally aligned perpendicular to a longitudinal axis of the apparatus.

7. The apparatus of claim 1, further comprising at least one riser interconnected to an inner surface of the left sidewall, the right sidewall, the middle sidewall, or the door.

8. The apparatus of claim 7, wherein the at least one riser comprises a first riser interconnected to the middle sidewall and a second riser interconnected to the left sidewall or the right sidewall.

9. The apparatus of claim 8, wherein an internal volume defined by the inner surfaces of the first riser, the second riser, and a sidewall not associated with a riser, and the door is adapted to receive and secure an elongate member having a cross sectional dimension of about 5.875 inches by 4.25 inches.

10. An apparatus for interconnecting to a beam, comprising:
    a frame having a left sidewall, a right sidewall, and a middle sidewall connecting the left sidewall to the right sidewall;
    a door interconnected to the left sidewall or right sidewall, the door having a slot configured for selective receipt of a tongue extending from the left or right sidewall that is not interconnected to the door; and
    a lock interconnected to the door and comprised of a slide with a hooked end, wherein the slide has an open position of use where the slide is rotated to align the hooked end with an opening in the tongue such that the hooked end is configured to be inserted through the opening, and a closed position of use where the hooked end is located outside the opening and the slide is rotated to prevent movement of the hooked end from the opening.

11. The apparatus of claim 10, wherein the door is hingedly interconnected to the left sidewall or the right sidewall.

12. The apparatus of claim 10, further comprising at least one riser interconnected to an inner surface of the left sidewall, the right sidewall, the middle sidewall, or the door.

13. The apparatus of claim 10, further comprising a handle associated with the middle sidewall and a handle associated with the door.

14. The apparatus of claim 13, wherein the handle associated with the door is interconnected to the slide.

15. An apparatus for interconnecting to a beam, comprising:
    a frame having a left sidewall, a right sidewall, and a middle sidewall connecting the left sidewall to the right sidewall, the middle sidewall;

a door having a first end rotatably interconnected to the left sidewall or right sidewall and a second end for selective interconnection to the sidewall not rotatably interconnected to the door;

a lock associated with the second end of the door;

a first handle interconnected to the left sidewall, the middle sidewall, the right sidewall, or the door, and a second handle interconnected to a sidewall or door opposite the sidewall or door the first handle is interconnected to; and wherein the lock is comprised of a slide with a hooked end, wherein the slide has an open position of use where the slide is rotated to align the hooked end with an opening in the tongue such that the hooked end is configured to be inserted through the opening, and a closed position of use where the hooked end is located outside the opening and the slide is rotated to prevent movement of the hooked end from the opening.

16. The apparatus of claim 15, wherein the door further includes a tube configured to receive a bar.

17. The apparatus of claim 15, wherein the door is hingedly interconnected to the left sidewall or the right sidewall.

18. The apparatus of claim 15, further comprising at least one riser interconnected to an inner surface of the left sidewall, the right sidewall, the middle sidewall, or the door.

\* \* \* \* \*